(12) United States Patent
Morlock

(10) Patent No.: US 9,273,820 B2
(45) Date of Patent: Mar. 1, 2016

(54) HOLDER FOR RECEIVING AND SECURING A VIBRATION- AND/OR SHOCK-SENSITIVE COMPONENT

(75) Inventor: Andreas Morlock, Pfinztal (DE)

(73) Assignee: Siemens Aktiengesellschaft, Munich (DE)

( * ) Notice: Subject to any disclaimer, the term of this patent is extended or adjusted under 35 U.S.C. 154(b) by 677 days.

(21) Appl. No.: 13/527,209

(22) Filed: Jun. 19, 2012

(65) Prior Publication Data

US 2013/0153740 A1 Jun. 20, 2013

(30) Foreign Application Priority Data

Jun. 20, 2011 (EP) ...................................... 11170606

(51) Int. Cl.
*F16M 13/00* (2006.01)
*F16F 1/373* (2006.01)
*F16F 15/08* (2006.01)

(52) U.S. Cl.
CPC ................ *F16M 13/00* (2013.01); *F16F 1/373* (2013.01); *F16F 15/08* (2013.01)

(58) Field of Classification Search
CPC . G11B 33/08; G02F 1/133308; B65D 81/107
USPC ...................... 248/560; 361/679.34
See application file for complete search history.

(56) References Cited

U.S. PATENT DOCUMENTS

| 2,448,281 A | 8/1948 | Saurer |
| 4,549,602 A | 10/1985 | Espinoza |
| 4,989,823 A | 2/1991 | Chapman |
| 7,106,582 B2 | 9/2006 | Albrecht et al. |
| 2002/0044416 A1* | 4/2002 | Harmon et al. ............... 361/685 |
| 2002/0167792 A1 | 11/2002 | Osterhout et al. |
| 2008/0158712 A1 | 7/2008 | Nakatani |
| 2010/0011386 A1* | 1/2010 | Fukasawa .......... G11B 5/59627 720/692 |
| 2012/0138493 A1* | 6/2012 | Tung-Ke ............. G11B 33/124 206/320 |

FOREIGN PATENT DOCUMENTS

| DE | 40 17 885 | 12/1990 |
| DE | 10 2005 055 178 | 3/2007 |
| EP | 1 612 798 | 1/2006 |
| EP | 1 939 885 | 7/2008 |
| JP | 03-14931 | 1/1991 |

* cited by examiner

*Primary Examiner* — Monica Millner
(74) *Attorney, Agent, or Firm* — Cozen O'Connor

(57) ABSTRACT

A holder for receiving and securing a vibration- and/or shock-sensitive component, where the holder is provided with a supporting plate. Good damping characteristics are achieved both under vibrational loading and under shock loading by providing the supporting plate with, at two opposite edges, at least one damping element for supporting a profiled rail. In order to support the profiled rail on an inner side of the respective damping element, the profiled rail is provided with a multi-level bearing surface, where one part of the bearing surface is arranged higher than the rest of the bearing surface, where the profiled rails are configured to fasten the component or side walls, which are respectively arranged substantially at right angles to the supporting plate and are configured to fasten the component.

7 Claims, 4 Drawing Sheets

FIG 1
FIG 2
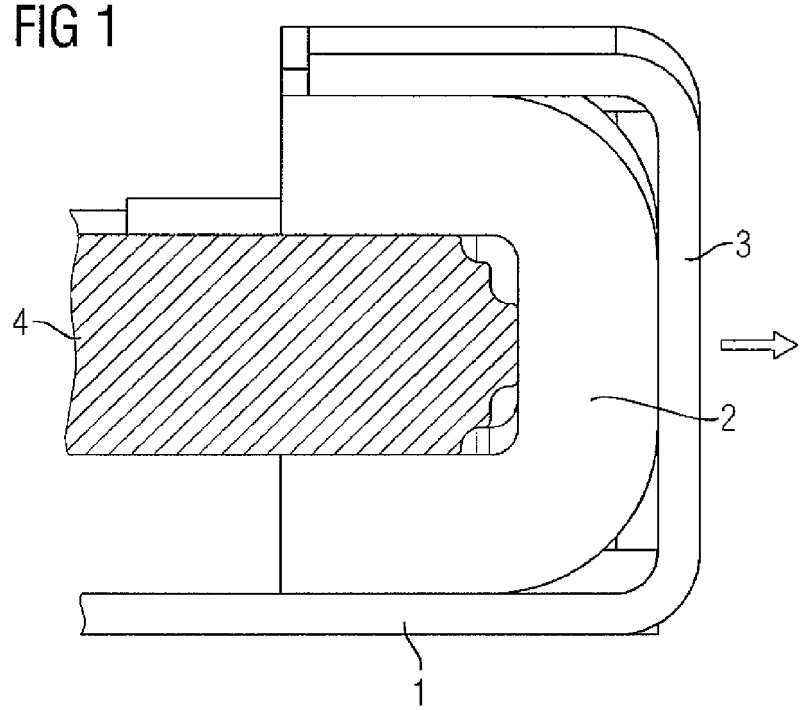
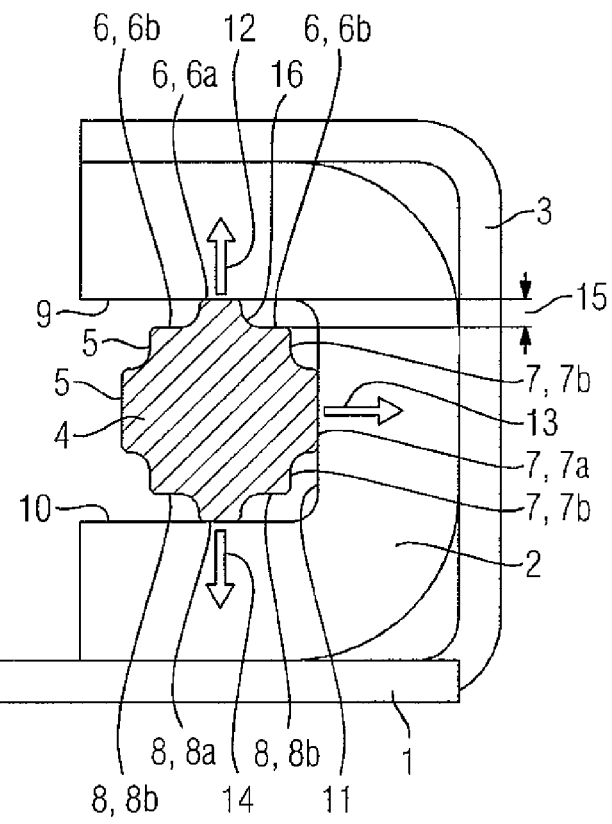

HOLDER FOR RECEIVING AND SECURING A VIBRATION- AND/OR SHOCK-SENSITIVE COMPONENT

BACKGROUND OF THE INVENTION

1. Field of the Invention

The invention relates to shock absorbers and, more particularly, to a holder for receiving and securing a vibration- and/or shock-sensitive component, where the holder is provided with a supporting plate.

2. Description of the Related Art

Electronic components, for example components comprising hard-disk or DVD drives of an industrial PC, have to meet demanding requirements with regard to high vibrational loads, on the one hand, and with respect to high shock loads, on the other hand. For example, specifications for such industrial PCs prescribe that, during their operation, an acceleration of about 10 m/s$^2$ at frequencies of up to 60 Hz (vibrational loading) and, additionally for a short time, an acceleration of about 50 m/s$^2$ (shock loading) must be possible without components of the industrial PC being damaged. To be able to meet such requirements, suitable measures are therefore necessary.

DE 10 2005 055 178 B3 discloses a conventional holder. Measures by which a great level of damping of a cuboidal vibration- and/or shock-sensitive component comprising a disk drive is achieved are described in DE 10 2005 055 178 B3. Arranged between a supporting plate and receiving means of the disk drive are elastic elements that are divided in two vertically in relation to the supporting plate, respectively, bent-away lugs of the receiving means being provided between the two parts of the elastic elements.

Described in European patent application 10160150.8 is an arrangement with a vibration- and/or shock-sensitive component and a supporting plate for receiving and securing the component, for example, a component comprising a disk drive, in which measures that achieve damping characteristics that are substantially the same in different directions of vibration. The supporting plate has on each of two opposite side walls, arranged perpendicularly in relation to the supporting plate, two horizontally spaced-apart bores, where lugs that are respectively provided with a further bore are also arranged at the corners of the supporting plate perpendicularly in relation thereto. Each lug forms an angle with one of the side walls that is adjacent to the respective lug, where elastic elements are arranged on the component such that they engage in the bores. The high degree of complexity in terms of structural design and production engineering is disadvantageous for the implementation of these measures.

SUMMARY OF THE INVENTION

It is therefore an object of the present invention to provide a holder by which good damping characteristics are achieved both under vibrational loading and under shock loading.

This and other objects and advantages are achieved in accordance with the invention by providing a holder in which the supporting plate has at two opposite edges at least one damping element for supporting a profiled rail, the profiled rail is provided with a multi-level bearing surface for supporting the profiled rail on an inner side of the respective damping element, where one part of the bearing surface is arranged higher than the rest of the bearing surface, and the profiled rails fasten the component or side walls, which are respectively arranged substantially at right angles to the supporting plate and are configured to fasten the component.

It is advantageous that, by means of the profile, separate spring tension can be provided for small and large deflections of the component from a rest position, for example, a component comprising a hard-disk drive. In one direction, a part of the multi-level bearing surface of the profiled rail that is arranged higher damps small deflections (vibrations), whereas the rest of the bearing surface damps larger deflections, which may occur when there are instances of shock loading. Therefore, an "own" spring tension or spring constant or spring tension can be "set" for this damping direction, which is achieved by the special configuration of the profile.

The part of the bearing surface that is arranged higher is formed, for example, as an inner portion of the bearing surface and the rest of the bearing surface is formed as an outer portion of this bearing surface, these expressions "inner portion and outer portion of the bearing surface" being chosen hereafter for the sake of simplicity and for better differentiation to refer respectively to the part of the bearing surface that is arranged higher and to the rest of the bearing surface.

In addition, the expression "at two opposite edges" is not necessarily understood as meaning two opposite outer edges of the supporting plate, but should rather be understood as also including two opposite extents or regions running parallel to one another within this supporting plate that are away from the outer edges.

Vibrations are damped in a direction, in that the inner portion of the bearing surface of the profiled rail, which represents a first spring tension, penetrates into the corresponding inner side of the damping element to a first depth of penetration. Here, this first depth of penetration comprises a transition from the inner portion to the outer portion of the bearing surface. When there is shock loading, the inner portion penetrates further, to a second depth of penetration, and the outer portion, which represents a second spring tension, additionally penetrates into the inner side of the damping element.

In an embodiment of the invention, the region of a transition from the inner portion to the outer portion of the bearing surface is hollowed substantially in the form of the fillet. This hollow in the form of a fillet or the radius of this hollow represents a "smooth" transition between the first spring hardness and the second spring hardness, i.e., a "smooth" transition between soft springing and hard springing.

In further embodiments of the invention, the cross section of the respective profiled rail is of a substantially T-shaped or cross-shaped form. Such profiled rails can be manufactured easily in terms of production engineering from an elastic sheet material.

In a further embodiment, the damping elements are substantially U-shaped or C-shaped, and each profiled rail has a number of multi-level bearing surfaces, which are respectively intended for supporting on one of the inner sides of the respective damping element. This makes it possible to realize in each case a damping in the direction of the respective inner side and a first and a second spring hardness for each of these directions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, refinements and advantages thereof are explained in more detail below on the basis of the drawing, in which an exemplary embodiment of the invention is illustrated and in which:

FIGS. 1 and 2 show cross-sectional representations of a damping element provided with a profiled rail in accordance with the invention;

DETAILED DESCRIPTION OF THE PREFERRED EMBODIMENTS

Figure 3:
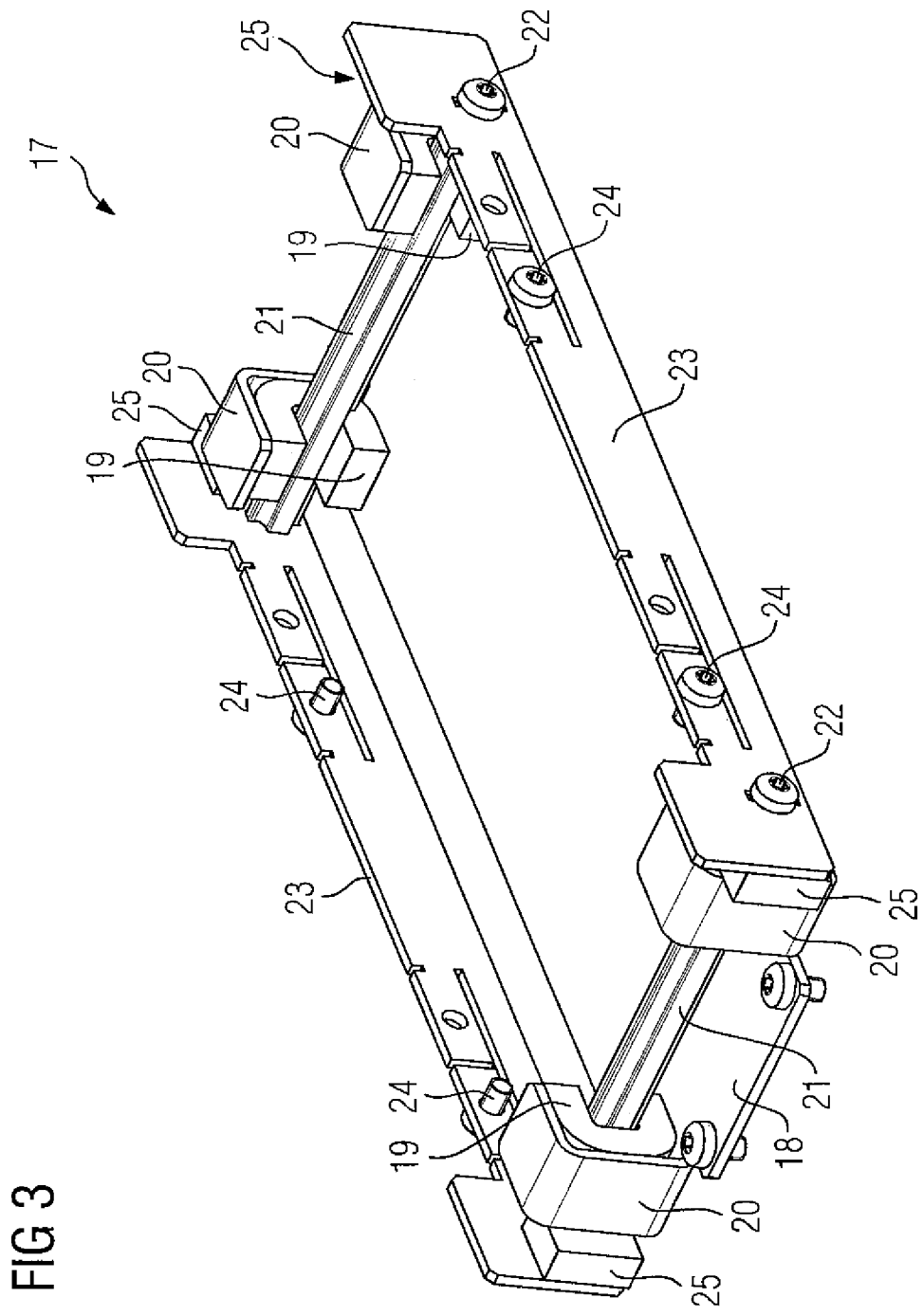
FIG. 3 shows a holder for receiving and securing a disk drive in accordance with the invention.

The parts that are the same in FIGS. 1 to 8 are provided with the same designations.

In the sectional representations depicted in FIGS. 1 and 2, an elastic substantially U-shaped damping element 2 is arranged at one edge of a supporting plate 1 of a holder for a disk drive. This damping element 2 is formed as an elastomer which is known per se, and which is produced in sheet form and is, for example, adhesively secured by a U-shaped bend in a likewise U-shaped receptacle 3 of the supporting plate 1. A profiled rail 4, the cross section of which in the present exemplary embodiment is of a substantially cross-shaped form, has multi-level bearing surfaces 5, 6, 7, 8, of which the bearing surfaces 6, 7, 8 are intended for supporting the profiled rail 4 on inner walls 9, 10 and 11, and therefore for damping in directions designated by 12, 13 and 14. Each of these multi-level bearing surfaces 6, 7, 8 has an inner portion 6a, 7a, 8a, which represents a first, low spring tension or smaller spring constant (soft springing), and an outer portion 6b, 7b, 8b, which represents a second, higher spring tension or greater spring constant (hard springing), the inner portions 6a, 7a, 8a each being arranged higher than the outer portions 6b, 7b, 8b.

A damping in direction 12 is discussed in more detail below. Vibrations occurring are damped in direction 12 by the inner portion 6a of the bearing surface 6 of the profiled rail 4 penetrating into the inner side 9 of the damping element 3 to a depth of penetration 15. This means that, to this depth of penetration 15, the first, low spring tension takes effect, determining the damping characteristics with regard to vibrations. In the case of a shock loading, the outer portion 6b additionally penetrates at least partially into the inner side 9 of the damping element 3, which means that in this case the second spring tension, higher in comparison with the first spring tension, and consequently greater damping, is brought about.

A transition 16 from the inner portion 6a to the outer portion 6b of the bearing surface 6 is hollowed substantially in the form of a fillet. This hollow in the form of the fillet or the radius of this hollow represents a "smooth" transition between the first spring tension and the second spring tension.

In the manner described, the inner portions 7a, 8a and the outer portions 7b, 8b thus act on the inner sides 10, 11 and damp instances of vibrational and shock loading in the directions 13 and 14.

With specific reference to FIG. 3, a holder 17 for receiving and securing a disk drive (not represented here) are shown. This holder 17, which can be fitted into a mounting location provided for it in an industrial PC, has a supporting plate 18, which is provided at each of two opposite edges with two U-shaped damping elements 19. These damping elements 19 are arranged in likewise U-shaped receptacles 20 of the supporting plate 18, the two damping elements 19 respectively of an edge being intended for receiving and supporting a profiled rail 21. The cross section of these profiled rails and the multi-level bearing surfaces are of a substantially cross-shaped form in the manner described. It should be understood that it is possible to provide for each of the two edges just one damping element, in which case the width thereof, and therefore the bearing surface thereof for the profiled rail, would have to be chosen to be greater. Side walls 23 intended for fastening a disk drive are fastened at right angles to the supporting plate 18 on the profiled rails 21 by screw connections 22. For this purpose, disk drive is arranged between the side walls 23 and fastened to these side walls 23 by screws 24, where the disk drive includes suitable threaded bores in which the screws 24 engage. Provided between the side walls 23 and the damping elements 19 are further damping elements 25, which bring about good damping characteristics in the axial direction of the profiled rails 21, both under vibrational loading and under shock loading.

Figure 4:
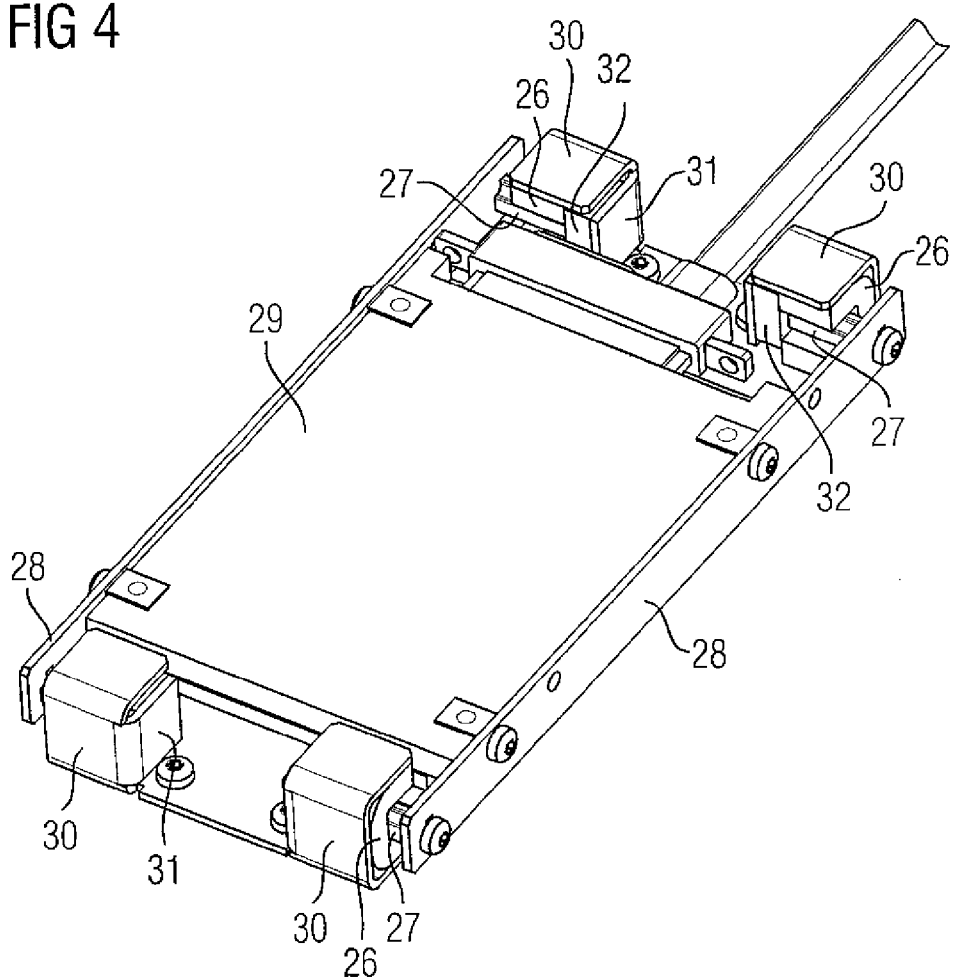
FIG. 4 shows a holder with a disk drive in accordance with the invention.
Figure 5:
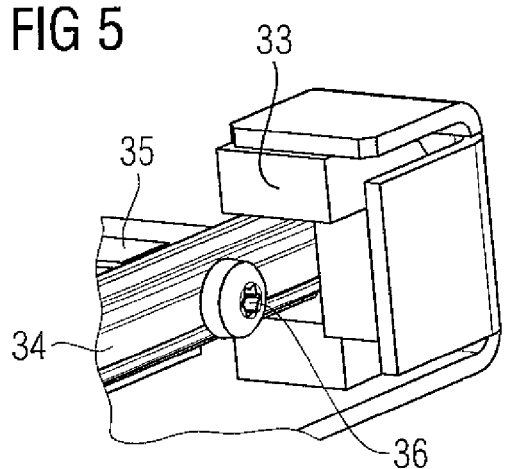
FIG. 5 shows a damping element provided with a profiled rail in accordance with the invention.

FIG. 4 shows an embodiment of a holder of which the supporting plate is likewise provided at each of two opposite edges with two U-shaped damping elements 26. As a difference from the embodiment of the holder depicted in FIG. 3, however, each of these damping elements 26 is intended for respectively receiving and supporting a profiled rail 27. Screwed in turn onto these four profiled rails 27 are side walls 28, to which a disk drive 29 is fastened by screws. Here, the damping elements 26 are also arranged in U-shaped receptacles 30, where in the present exemplary embodiment these receptacles 30 each have a side part 31. Arranged between the respective side part 31 and the respective damping element 26 is a further damping element 32, where the opposite damping elements 32 of an edge bring about good damping characteristics under vibrational loading and shock loading of the disk drive 29 in the axial direction of the profiled rails 27.

It should be understood that it is possible to fasten the disk drive 29 directly to the profiled rails 27, allowing the side walls 28 to be omitted. In this connection, reference is made to FIG. 5, in which only one damping element 33 is represented for purposes of simplicity, with a profiled rail 34 arranged in this damping element 33. It is indicated that a disk drive 35 is fastened to this profiled rail 34 by a screw connection 36.

Figure 6:
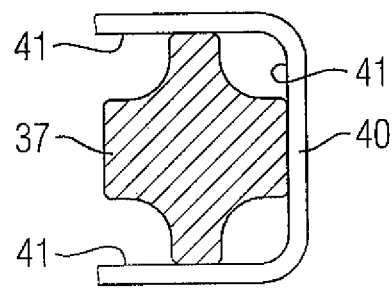
FIGS. 6 to 8 show cross sections of profiled rails in accordance with the invention.
Figure 7:
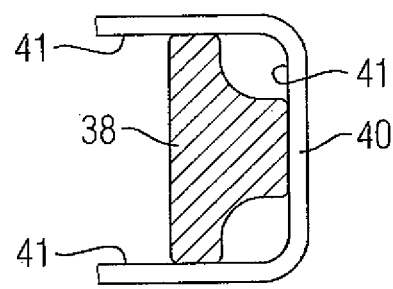
Figure 8:
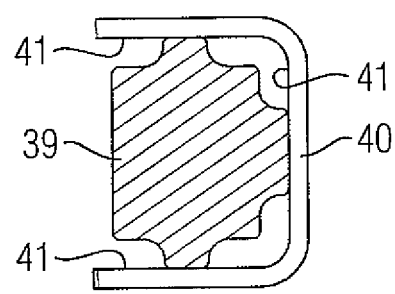

FIGS. 6 to 8 show further profiled rails 37, 38, 39 with different cross sections. These profiled rails 37, 38, 39 each have multi-level bearing surfaces and are arranged in U-shaped damping elements 40. The multi-level bearing surfaces respectively bring about very good damping characteristics with regard to instances of vibrational and shock loading in the direction of the respective inner walls 41 of these U-shaped damping elements 40.

Thus, the disclose embodiments of the invention provide a holder 17 for receiving and securing a vibration- and/or shock-sensitive component 29, 35, which is distinguished by good damping characteristics both under vibrational loading and under shock loading. The holder 17 is provided with a supporting plate 1, 18, the supporting plate 1, 18 having at each of two opposite edges at least one damping element 2, 19, 26, 40 for supporting a profiled rail 4, 21, 27, 34, 37, 38, 39. For supporting the profiled rail 4, 21, 27, 34, 37, 38, 39 on an inner side 9, 10, 11, 41 of the respective damping element 2, 19, 26, 40, the profiled rail 4, 21, 27, 34, 37, 38, 39 is provided with a multi-level bearing surface 6, 7, 8, one part 6*a*, 7*a*, 8*a* of the bearing surface 6, 7, 8 being arranged higher than the rest of the bearing surface 6*b*, 7*b*, 8*b*. Furthermore, the profiled rails 4, 21, 27, 34, 37, 38, 39 are intended for fastening the component 29, 35 or side walls 23, 28, which are respectively arranged substantially at right angles to the supporting plate 1, 18 and are designed for fastening the components 29, 35.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A holder for receiving and securing at least one of a vibration-sensitive component and a shock-sensitive component, comprising:
    a supporting plate including side walls extending from the supporting plate and contacting receptacles at each of two opposite corners defined by the side walls and supporting plate;
    at least one profiled rail; and
    at least one damping element housed in the receptacles and supporting the at least one profiled rail, the at least one profiled rail having a multi-level bearing surface supporting the at least one profiled rail on an inner side of a respective damping element of the at least one damping element, a part of the multi-level bearing surface being arranged higher than a remainder of the multi-level bearing surface;
    wherein the at least one profiled rail is configured to fasten at least one of (i) the vibration-sensitive component and (ii) the shock-sensitive component; and the side walls are respectively arranged substantially at right angles to the supporting plate and are configured to fasten at least one of (i) the vibration-sensitive component and (ii) the shock-sensitive component.

2. The holder as claimed in claim 1, wherein a region of a transition from the part of the multi-level bearing surface to the remainder of the multi-level bearing surface is substantially hollowed and comprises a fillet.

3. The holder as claimed in claim 1, wherein a cross section of the at least one profiled rail is substantially T-shaped.

4. The holder as claimed in claim 2, wherein a cross section of the at least one profiled rail is substantially T-shaped.

5. The holder as claimed in claim 1, wherein a cross section of the at least one profiled rail is substantially cross-shaped.

6. The holder as claimed in claim 2, wherein a cross section of the at least one profiled rail is substantially cross-shaped.

7. The holder as claimed in claim 1, wherein the at least one damping element is substantially U-shaped or C-shaped rail; and
    wherein the at least one profiled rail includes a plurality of multi-level bearing surfaces, which are each configured to provide support on respective inner sides of the at least one damping element.

* * * * *